United States Patent
Liao

(10) Patent No.: US 8,886,668 B2
(45) Date of Patent: Nov. 11, 2014

(54) NAVIGATION SYSTEM WITH SEARCH-TERM BOUNDARY DETECTION MECHANISM AND METHOD OF OPERATION THEREOF

(75) Inventor: BoSen Liao, Beijing (CN)

(73) Assignee: Telenav, Inc., Sunnyvale, CA (US)

( * ) Notice: Subject to any disclaimer, the term of this patent is extended or adjusted under 35 U.S.C. 154(b) by 70 days.

(21) Appl. No.: 13/366,551

(22) Filed: Feb. 6, 2012

(65) Prior Publication Data
US 2013/0204895 A1  Aug. 8, 2013

(51) Int. Cl.
*G06F 17/30* (2006.01)
(52) U.S. Cl.
CPC .............................. *G06F 17/30864* (2013.01)
USPC ........................................................ 707/772
(58) Field of Classification Search
CPC ................................................ G06F 17/30864
USPC ........................................................ 707/772
See application file for complete search history.

(56) References Cited

U.S. PATENT DOCUMENTS

| | | | |
|---|---|---|---|
| 5,806,201 A | 9/1998 | Feichtinger | |
| 6,266,636 B1 * | 7/2001 | Kosaka et al. | 704/244 |
| 6,758,403 B1 * | 7/2004 | Keys et al. | 235/462.45 |
| 7,562,205 B1 * | 7/2009 | Case et al. | 711/209 |
| 8,060,494 B2 | 11/2011 | Seide et al. | |
| 2001/0013072 A1 * | 8/2001 | Okada et al. | 709/315 |
| 2005/0228639 A1 * | 10/2005 | Abe et al. | 704/7 |
| 2006/0122984 A1 * | 6/2006 | Byers et al. | 707/3 |
| 2010/0010965 A1 * | 1/2010 | Edlund et al. | 707/3 |
| 2010/0138411 A1 | 6/2010 | Judy et al. | |
| 2010/0174698 A1 * | 7/2010 | Odland et al. | 707/706 |
| 2011/0179013 A1 * | 7/2011 | Jiang et al. | 707/711 |
| 2011/0251789 A1 * | 10/2011 | Sanders et al. | 701/202 |

* cited by examiner

*Primary Examiner* — Etienne Leroux
*Assistant Examiner* — Jared Bibbee
(74) *Attorney, Agent, or Firm* — IP Investment Law Group

(57) ABSTRACT

A method of operation of a navigation system includes: detecting a search string; determining a forward-element using a forward-boundary within the search string in a forward direction; determining a backward-element in a backward direction up to the forward-boundary using a backward-boundary within the search string; and determining a matching result for the search string using the forward-element and the backward-element for displaying on a device.

20 Claims, 6 Drawing Sheets

US 8,886,668 B2

NAVIGATION SYSTEM WITH SEARCH-TERM BOUNDARY DETECTION MECHANISM AND METHOD OF OPERATION THEREOF

TECHNICAL FIELD

The present invention relates generally to a navigation system, and more particularly to a navigation system using searching mechanism.

BACKGROUND ART

Modern portable consumer and industrial electronics, such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new device space. There are many technological solutions to take advantage of this new device location opportunity. Further, the market space seeks technological advancements, such as ones based on the device location opportunity, which may provide comfort and efficiency in the consumers' daily lives.

Thus, a need still remains for a navigation system that can provide further functionalities based on device location data. In view of the increasing consumer needs, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: detecting a search string; determining a forward-element using a forward-boundary within the search string in a forward direction; determining a backward-element in a backward direction up to the forward-boundary using a backward-boundary within the search string; and determining a matching result for the search string using the forward-element and the backward-element for displaying on a device.

The present invention provides a navigation system, including: a search-interface module for detecting a search string; a first-analysis module, coupled to the search-interface module, for determining a forward-element using a forward-boundary within the search string in a forward direction; a second-analysis module, coupled to the search-interface module, for determining a backward-element in a backward direction up to the forward-boundary using a backward-boundary within the search string; and a result-search module, coupled to the first-analysis module, for determining a matching result for the search string using the forward-element and the backward-element for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
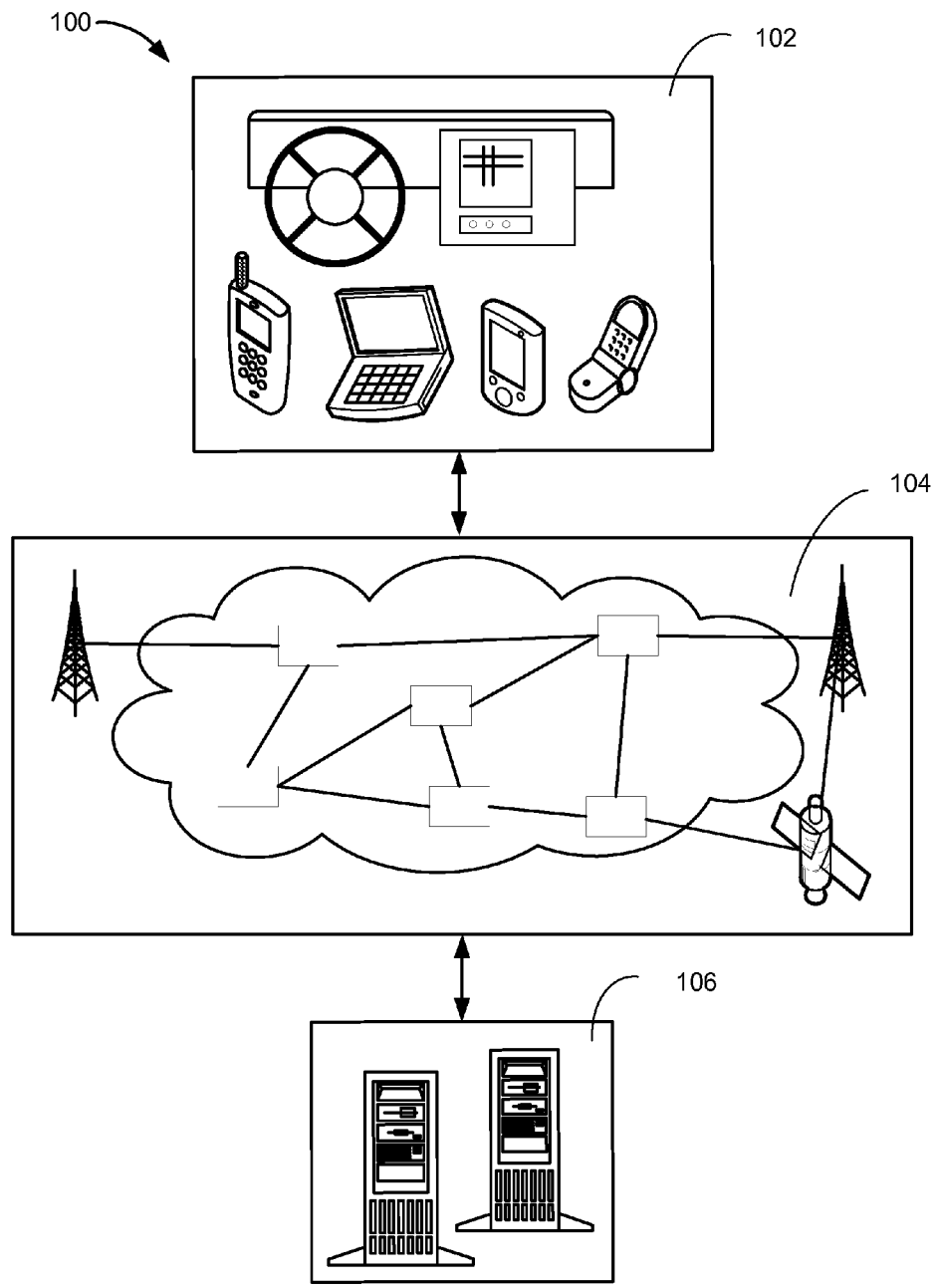
FIG. 1 is a navigation system with search-term boundary detection mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "point of interest" as used herein is defined as a specific location or a business on a map representing a specific location that are commonly sought by users or have special meanings for people. The point of interest can represent specific businesses or landmarks, or represent a user's home or work. The point of interest can also include name, title, nickname, category or type, terms relating to a location, or a combination thereof.

Referring now to FIG. 1, therein is shown a navigation system 100 with search-term boundary detection mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10 Business Class mainframe or a HP ProLiant ML server. Yet another example, the second device 106 can be a particularized machine, such as a portable computing device, a thin client, a notebook, a netbook, a smartphone, personal digital assistant, or a cellular phone, and as specific examples, an Apple iPhone, Palm Centro, or Moto Q Global For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard, wireless fidelity, and worldwide interoperability for microwave access are examples of wireless communication that can be included in the communication path 104. Ethernet, digital subscriber line, fiber to the home, and plain old telephone service are examples of wired communication that can be included in the communication path 104.

Further, the communication path 104 can traverse a number of network topologies and distances. For example, the communication path 104 can include direct connection, personal area network, local area network, metropolitan area network, wide area network or any combination thereof.

Figure 2:
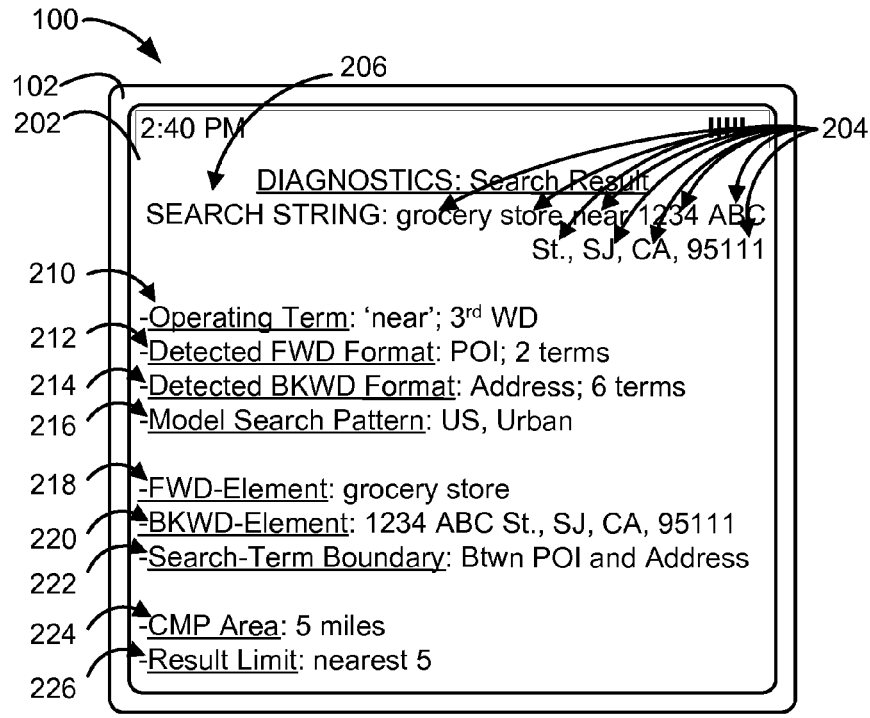
FIG. 2 is a first example of a display interface of the first device.

Referring now to FIG. 2, therein is shown a first example of a display interface 202 of the first device 102. The display interface 202 can show a window detailing elements of a search. The display interface 202 can show a search word 204 and a search string 206 for the search.

The search word 204 is defined as a letter, symbol, number, or a combination thereof identifying an object of the search. The search word 204 can represent an idea, object, person, place, text, or a combination thereof. For example, the search word can be 'life' for finding concept or idea of life, things having the word 'life' in the name, person or place associated with the word 'life', texts containing the word 'life', or a combination thereof.

The search string 206 is defined as a sequence of words, numbers, symbols, identifiers or a combination thereof combined to describe an object of a search. The search string 206 can be a plurality of the search word 204 identifying the object of the search. The search string 206 can have different terms for the search word 204 and can have separation by a space, grammatical symbol, such as a comma or a semicolon, dash, slash, or a combination thereof.

For example, the search string 206 can be 'book life' to identify books having the search word 204 'life' or discussing the idea of life. Also, for example, the search string 206 can be "legal definition of life" to specify the object of the search to how the field of law views and defines life.

For illustrative purposes, the search string 206 will be described as being used to search for locations and for ideas, objects, persons, texts, or a combination thereof related to locations. However, it is understood that the search string 206 and the object of the search can be different as described above. For example, the search string 206 can be related to a person, an abstract concept or principle, history, art, or other information.

The search string 206 can have an operating term 210. The operating term 210 is defined as operators for relating one search word to another. The operating term 210 can be Boolean operators, symbols, location operators, or a combination thereof. For example, the operating term 210 can be 'not', '&', 'near', 'within', or a combination thereof. The operating term 210 can be a special type or subset of the search word 204.

The navigation system 100 can parse the search string 206 forwards or backwards to perform the search. In parsing the search string 206, the display interface 202 can show a detected forward-format 212, a detected backward-format 214, and a model search pattern 216.

The detected forward-format 212 is defined as a recognized format for a plurality of the search word 204 in the beginning of the search string 206. For example, the detected forward-format 212 can be a format for point of interest, key word, name, title, or address.

The beginning of the search string 206 can be identified using the language settings. For example, the beginning of the search string 206 can be top or left of the input string when the language setting is in English. Also, for example, the beginning of the search string 206 can be top right of the input text when the language setting is traditional Chinese or Japanese.

For illustrative purposes, the beginning of the search string 206 will be described as being the left most end of the search string 206. However, it is understood that the beginning can be located elsewhere. For example, the beginning of the search string 206 can be the right most end, the top, the bottom, or a combination thereof. The end of the search string 206 will be described as being the opposite end of the search string 206 as the beginning.

The detected forward-format 212 can also be the pattern in the sequence of search words at the beginning of the search string 206. For example, the detected forward-format 212 can be the format and order of the words on the left most side of the search string 206 when the search is in English or Spanish.

The detected backward-format 214 is defined as a recognized format for a plurality of the search word 204 in the end of the search string 206. The detected backward-format 214 can be similar to the detected forward-format 212. The detected backward-format 214 can be the sequence of search words at the end of the search string 206. For example, the detected backward-format 214 can be the format of the words on the right most side of the search string 206 when the search is in English or on the bottom left most side when the search is in Chinese.

The model search pattern 216 is defined as a format or a pattern for the search string 206 commonly or likely used by user of the navigation system 100. The model search pattern 216 can be the format of the search string 206 to identify locations, such as using cross-streets of an intersection or an address format. The model search pattern 216 can also be the pattern for the search string 206, such as point of interest information preceding the address or a commonly searched location.

For example, the model search pattern 216 may be street intersections or landmarks in certain regions of Asia where the users identify locations based on intersections or landmarks or such format often used by a particular owner of the first device 102. Also, for example, the model search pattern 216 for United States may include address format for United States and common pattern for the search string 206, such as point of interest followed by an address.

The model search pattern 216 can be commonly used patterns in specific regions. The model search pattern 216 can be based on continent, countries, regions, states, counties, cities, neighborhoods, languages, user inputs, or a combination thereof. The model search pattern 216 can include commonly used type, sequence, combination, or a combination thereof for the search string 206 particular to a region or a particular user. The navigation system 100 can identify and modify the model search pattern 216. The details regarding the identification and the modification of the model search pattern 216 will be discussed below.

The display interface 202 can also show a forward-element 218, a backward-element 220, and a search-term boundary 222 when the search string 206 has multiple identifiable information. The forward-element 218 is defined as the beginning portion of the search string 206 describing an object of the search. The forward-element 218 can be the first set of search words that convey an identifiable search object, such as a person, place, thing, idea, phrase, or a combination thereof.

The forward-element 218 can follow the format of the detected forward-format 212. The forward-element 218 can be specific instance of a point of interest, key word, name, title, or address at the beginning portion of the search string 206. The forward-element 218 can also be the beginning portion of the search string 206 that matches an entry in a dictionary used by the navigation system 100.

The backward-element 220 is defined as the end portion of the search string 206 describing an object of the search. The backward-element 220 can be similar to the forward-element 218 in that the backward-element 220 also conveys an identifiable search object. The backward-element 220 can follow the format of the detected backward-format 214. The backward-element can be identifiable instances of point of interest, key word, name, title, or address at the ending portion of the search string 206. The backward-element 220 can also be the end portion of the search string 206 that matches an entry in a dictionary used by the navigation system 100.

The navigation system 100 can recognize an element, a set of search words that have a meaning or describes the object of the search within the search string 206. The navigation system 100 can recognize the element within the search string 206 by searching for the set of search words in a dictionary or by comparing against a pattern, such as an address format or the model search pattern 216.

For example, the navigation system 100 can search for the first word at the beginning of the search string 206 in a dictionary for point of interest information, the operating term 210, address information, or a combination thereof. When a match is not found, the navigation system 100 can iteratively include the next word in the search string 206 and repeat the search until a match is found.

Also, for example, the navigation system 100 can compare the last word at the end of the search string 206 with the address format or the model search pattern 216 and repeat the comparison iteratively using the next word until a match is found. Details regarding the recognition of the elements within the search string 206 will be described below.

The search-term boundary 222 is defined as a divider between recognizable elements within the search string 206. The search-term boundary 222 can be a formatting division, such as a character space or a carriage return, a punctuation mark, such as a comma or a semi-colon, special characters, an instance of the operating term 210, or a combination thereof. The search-term boundary 222 can be between instances of the search word 204 and separate different ideas, formats, or components of the search string 206.

For example, the search-term boundary 222 can be the character space between 'grocery store' and 'near', the space between 'near' and '1234' marking the beginning of a street address. Also, for example, the search-term boundary 222 can be the operating term 210 between the forward-element 218 and the backward-element 220 in the search string 206 having two components joined by the operating term 210.

For illustrative purposes, the search string 206 will be described as having two components or formats within the search string 206 and one instance of the search-term boundary 222, having a point of interest information followed by an address. However, it is understood that the search string 206 can be different. For example, the search string 206 can have more than two components and multiple instances of the search-term boundary 222 within the search string 206.

Continuing with the example, the navigation system 100 can repeat the steps described below to manage the search string 206 having multiple elements and boundaries. Also, for example, the search string 206 can have different formats, such as the address preceding the point of interest or have a name, title, or another address instead of the point of interest information.

The display interface 202 can further show a comparison area 224 and a result limit 226. The comparison area 224 is defined as an area around the search results for analyzing and selecting results of the search using the search string 206. The comparison area 224 can be based on results of the forward-element 218, the backward-element 220, or a combination thereof. For example, the comparison area 224 can be area within 5 miles of or the same city block as the forward-element 218, the backward-element 220, or a combination thereof. Also, for example, the comparison area 224 can be a file format, minimum likelihood of matching, threshold percentage of match, or a combination thereof.

The result limit 226 is a number, proximity, location, relevance, or a combination thereof limiting the results of performing the search. For example, the result limit 226 can be 5, nearest 5 matches within zip code 95111 and meeting all search terms.

Figure 3:
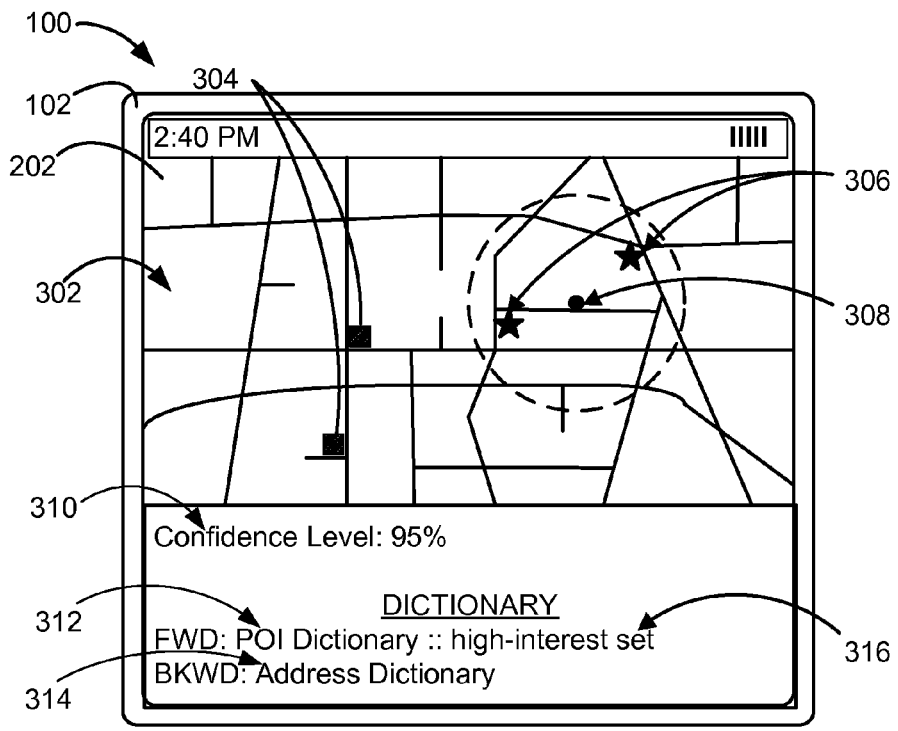
FIG. 3 is a second example of the display interface of the first device.

Referring now to FIG. 3, therein is shown a second example of the display interface 202 of the first device 102. The display interface 202 can show the diagnostics window detailing the results of the search operation based on the search string 206 of FIG. 2.

The display interface 202 can show a map 302, a forward-search result 304, a backward-search result 306, and a matching result 308. The map 302 is defined as a diagrammatic representation of an area showing physical features. For example, the map 302 can represent a layout of a city visually or represent a city block with a series of written or audible coordinates, such as GPS coordinates or longitude and latitude, of entities that make up the city block. The map 302 can represent a continent, country, region, state, county, city, neighborhood, city block, a portion thereof, or a combination thereof.

The forward-search result 304 is defined as a result of searching for the forward-element 218 of FIG. 2 in a dictionary used by the navigation system 100. The backward-search result 306 is defined as a result of performing a separate intermediate search using the backward-element 220 of FIG. 2. The forward-search result 304 and the backward-search result 306 can represent a document, website or link to a website, location, establishment, person, thing, or a combination thereof having or relating to the forward-search result 304, the backward-search result, or a combination thereof.

For example, the forward-search result 304 can be establishments that match the point of interest information contained in the forward-element 218 and the backward-search result 306 can be coordinates of the address contained in the backward-element 220. Also, for example, the forward-search result 304 can be a link to a website relating to the forward-element 218 and the backward-search result 306 can be a current location of the first device 102.

The matching result 308 is defined as a result of performing a search using the search string 206. The matching result 308 can represent a person, place, thing, entity, establishment, website or a website to a link, or a combination thereof matching or relating to the search string 206.

For example, the matching result 308 can be one or more establishment specified in the forward-element 218 within a five mile radius of an address specified in the backward-element 220. Also, for example, the matching result 308 can be the portions of a website specified in the forward-element 218 relating to the location specified in the backward-element 220. As a more specific example, the matching result 308 for the search string 206 having 'grocery store near 1234 ABC St., SJ, Calif., 95111' can be location, name, website, or a combination thereof for all merchants selling grocery items near the specified address.

The display interface 202 can also show a confidence level 310, a point-of-interest dictionary 312, and an address dictionary 314. The confidence level 310 is defined as likelihood that the matching result 308 is the object of the search sought by the search string 206. The confidence level 310 can be a calculated percentage, score, selected level, such as high or 4 of 10, or a combination thereof. The confidence level 310 can be based on analyzing the search string 206, analyzing the forward-search result 304, the backward-search result 306, the matching result 308, or a combination thereof.

The point-of-interest dictionary 312 is defined as a collection of points of interest. The point-of-interest dictionary 312 can be specific to an area, such as Asia or southern part of a city. The point-of-interest dictionary 312 can have a collection of search word sequences that represent a location. For example, the point-of-interest dictionary 312 can include names, titles, nicknames, categories or types, terms relating to locations, or a combination thereof. The point-of-interest dictionary 312 can also have coordinates, addresses, or both related to each represented location.

The point-of-interest dictionary 312 can have a high-interest set 316. The high-interest set 316 is defined as a subset of points of interest within the point-of-interest dictionary 312 that is often sought or referenced. The high-interest set 316 can be a collection of points of interest that is often referenced, traveled to or from, searched, or a combination thereof with the first device 102. The high-interest set 316 can also be a subset likely or known to be commonly referenced by average or most users.

The address dictionary 314 is defined as a collection of addresses. The address dictionary 314 can be similar to the point-of-interest dictionary 312 but for addresses representing locations. The address dictionary 314 can have point of interest information associated with each of the addresses within the dictionary.

Figure 4:
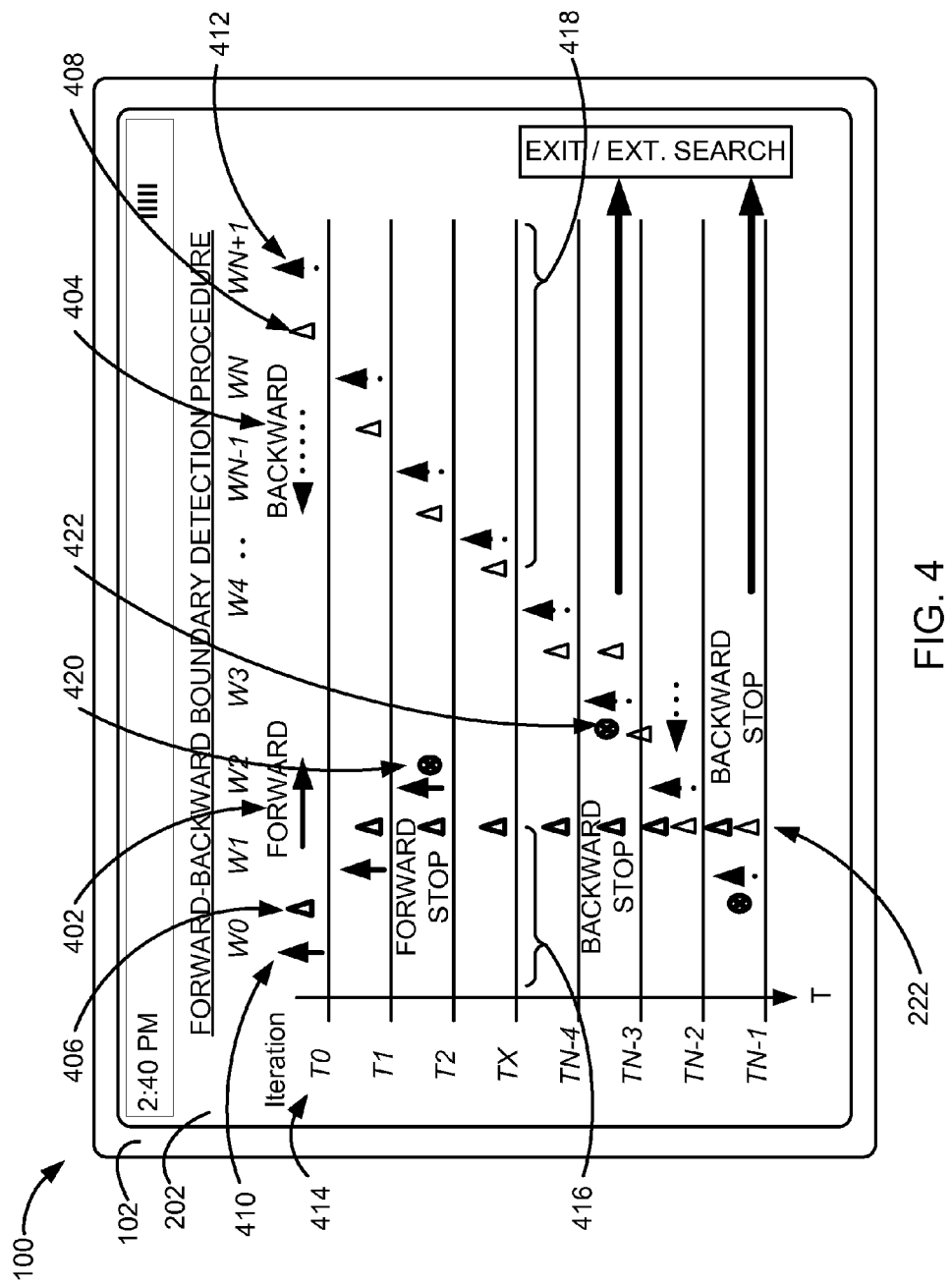
FIG. 4 is a third example of the display interface of the first device.

Referring now to FIG. 4, therein is shown a third example of the display interface 202 of the first device 102. The display interface 202 can show a forward direction 402, a backward direction 404, a forward-boundary 406, a backward-boundary 408, a forward-pointer 410, and a backward-pointer 412. The display interface can also show an iteration number 414 and the search-term boundary 222.

The forward direction 402 is defined as a direction for reading. The forward direction 402 can be determined based on location or language. For example, western European and American regions can have left to right as the forward direction 402. Also, for example, traditional Japanese, traditional Chinese, Arabic or Hebrew languages can have top to bottom, right to left as the forward direction 402.

The backward direction 404 is defined as the direction opposite of the forward direction 402. For example, the backward direction 404 can be right to left in English and bottom to top or left to right for Chinese.

The forward-boundary 406 is defined as a marker for noting an end of terms analyzed in the forward direction 402. The forward-boundary 406 can be placed at the end of a sequence of the search word 204 of FIG. 2 being analyzed at the beginning of the search string 206 of FIG. 2. The navigation system 100 can move the forward-boundary 406 in the forward direction 402 after incrementally analyzing the search string 206. The forward-boundary 406 can be at the end of the forward-element 218 of FIG. 2 at the end of the analysis.

The backward-boundary 408 is defined as a marker for noting a beginning of the terms being analyzed in the backward direction 404. The backward-boundary can be placed at the beginning of a sequence of the search word being analyzed at the end of the search string 206. The navigation system 100 can move the backward-boundary 408 in the backward direction 404 after incrementally analyzing the search string 206. The backward-boundary 408 can be at the beginning of the backward-element 220 of FIG. 2 at the end of the analysis.

The forward-pointer 410 is defined as a marker for a place in the search string 206 for analyzing in the forward direction 402. The forward-pointer 410 can be used to mark the search words being analyzed in the forward direction 402. The forward-pointer 410 can be a computer language pointer, memory address, visual marker, starting point, ending point, or a combination thereof.

The backward-pointer 412 is defined as a marker for a place in the search string 206 for analyzing in the backward direction 404. The backward-pointer 412 can be used to mark the search words being analyzed in the backward direction 404. The backward-pointer 412 can be similar to the forward-pointer 410.

The iteration number 414 is defined as an identifier for noting progress or number of times a step or process has been performed. For example, the iteration number 414 can be the number of times a signal passes through a feedback loop or a counter keeping track of a number of calculations a device has performed.

The navigation system 100 can use the forward-pointer 410, the backward-pointer 412, the forward-boundary 406, the backward-boundary 408, or a combination thereof to analyze the search string 206. The navigation system 100 can analyze the search string 206 and extract point of interest as 'what' and address as 'where' a user intends to find using the search string 206.

The navigation system 100 can extract the 'what' and the 'where' using the forward-pointer 410, the backward-pointer 412, the forward-boundary 406, the backward-boundary 408, or a combination thereof to analyze the search string 206 in the forward direction 402, the backward direction 404, or in both direction simultaneously. The navigation system 100 can separately analyze or synchronously detect the search-term boundary 222 of FIG. 2 through the simultaneous analysis. The details regarding the search and analysis will be described below.

The navigation system 100 can use two threads, a front-thread 416 and an end-thread 418, to detect the search-term boundary 222. The front-thread 416 is defined as a sequence of values of the search word 204 in the beginning of the search string 206 being analyzed by the navigation system 100. The front-thread 416 can increase or decrease in size between steps, processes, or iterations by adding or deleting words at the end of the forward direction 402 into the front-thread 416.

The end-thread 418 is similar to the front-thread 416 but at the end of the search string 206 and adding or deleting words at the end of the backward direction 404.

The navigation system 100 can calculate and determine the confidence level 310 of FIG. 3 as being accurate and satisfactory result of the analysis when the two threads return one boundary. If the two threads do not return a common boundary, the navigation system 100 can return the forward-boundary 406, the backward-boundary 408, or both, which can be used to validate search results and improve recall in comparison with one-direction boundary detection methods.

The navigation system 100 can use two threads to synchronously detect the search-term boundary 222 by adding two empty strings at the beginning and the end of the search string 206 as shown in the iteration number 414 of 'T0'. The front-thread 416 can be an empty string at the beginning and the end-thread 418 can be a separate empty string at the end of the search string 206.

The navigation system 100 can create two pointers, the forward-pointer 410 and the backward-pointer 412. The navigation system 100 can set the forward-pointer 410 to the first search word in the search string 206, which is noted as 'W0'. The navigation system 100 can set the backward-pointer 412 to the last search word in the search string 206, which is noted as 'WN+1'.

The navigation system 100 can initialize the front-thread 416 to include the search word 204 at the beginning of the search string 206 using the forward-pointer 410. The navigation system 100 can initialize the end-thread 418 to include the search word 204 at the end of the search string 206 using the backward-pointer 412. The navigation system 100 can move the forward-boundary 406 adjacent to the end of the front-thread 416 in the forward direction 402 and the backward-boundary 408 adjacent to the end of the end-thread 418 in the backward direction 404.

For example, the navigation system 100 can have the search string 206 having the value of 'grocery store, 1234 ABC St. SJ, Calif., 95111'. At the iteration step of 'T0', the forward-pointer 410 can point to 'grocery' and the backward-pointer 412 can point to '95111'. The front-thread 416 can have 'grocery' and the end-thread 418 can have '95111'.

The navigation system 100 can perform the next step or iteration after initializing the values as described above. The navigation system 100 can search various dictionaries for the front-thread 416 and the end-thread 418. The dictionaries for searching can be selected using the model search pattern 216 of FIG. 2. The model search pattern 216 can require the navigation system 100 to search a particular dictionary, such as the point-of-interest dictionary 312 of FIG. 3 first for the front-thread 416 and another dictionary, such as the address dictionary 314 of FIG. 3, first for the end-thread 418.

For illustrative purposes, the navigation system 100 will be described as having the search string 206 indicating the model search pattern 216 for users in United States, and the model search pattern 216 requiring the navigation system 100 to search the point-of-interest dictionary 312 for the front-thread 416 and the address dictionary 314 for the end-thread 418. However, it is understood that the navigation system 100 can be different.

For instance, the model search pattern 216 can be for users in Asia, Chile, or a particular user in a neighborhood in Tokyo. Also, for instance, the model search pattern 216 for United States can require searching for both the front-thread 416 and the end-thread 418 in the address dictionary 314 or other dictionaries, such as personal dictionaries or emergency dictionaries.

If the navigation system 100 finds the value of the front-thread 416 in the point-of-interest dictionary 312 or finds a partial match with a phrase, the navigation system 100 can move the forward-pointer 410 in the forward direction 402 to the next word denoted 'W1'. The navigation system 100 can initialize the forward-boundary 406 to be between 'W0' and 'W1'.

If the navigation system 100 dos not find a match or a partial match in the point-of-interest dictionary 312, the navigation system 100 can preserve the value or position of the forward-pointer 410, the forward-boundary 406, the front-thread 416, or a combination thereof. The navigation system 100 can also enter a forward-stop state 420 when no matches are found in the forward direction 402.

The forward-stop state 420 is defined as a state where the navigation system 100 stops searching in the forward direction 402. The forward-stop state 420 can occur when the navigation system 100 finds a complete match or no match is found of the information sought within a given dictionary or when no match is found. The navigation system 100 can suspend the search steps in the specified direction or repeat the search using a different dictionary.

During the same iteration 'T0', if the navigation system 100 finds the value of the backward-thread or a partial match with a phrase in the address dictionary 314, the navigation system 100 can move the backward-pointer 412 in the backward direction 404 to the next word denoted 'WN'. Also, the navigation system 100 can skip the search word 204 or treat it as if it is found in the dictionary when the search word 204 is a number. The navigation system 100 can also initialize the backward-boundary 408 to be between 'WN' and 'WN−1'.

If the navigation system 100 does not find a match or a partial match, the navigation system 100 can preserve the value or position of the backward-pointer 412, the backward-boundary 408, the end-thread 418, or a combination thereof. The navigation system 100 can also enter a backward-stop state 422 when no matches are found in the backward direction 404.

The backward-stop state 422 is defined as a state where the navigation system 100 stops searching in the backward direction 404. The backward-stop state 422 can occur when the navigation system 100 finds a complete match or no match is found of the information sought within a given dictionary or when no match is found. The navigation system 100 can suspend the search steps in the specified direction or repeat the search using a different dictionary.

If both the front-thread 416 and the end-thread 418 are not found in the respective dictionaries, the searches can be repeated using different dictionaries. Furthermore, since no matches were found in the point-of-interest dictionary 312 and the address dictionary 314 the search string 206 can be treated as searching for something other than a location.

Continuing with the example, if 'grocery' is found in the point-of-interest dictionary 312, the navigation system 100 can set the forward-pointer 410 to be between 'grocery' and 'store'. Since '95111' is a number, the navigation system 100 can treat the number as having been found in the address dictionary 314 and set the backward-pointer 412 to be between 'CA' and '95111'. If 'grocery' is not found in the point-of-interest dictionary 312, if the search string 206 included a word at the end not found in the address dictionary 314, or both, the navigation system 100 can treat the search string 206 as searching for something other than a location and repeat the search using different dictionaries.

The navigation system 100 can repeat the steps described above for the iteration number 414 'T1'. The navigation system 100 can search for the entire value of the front-thread 416 and the end-thread 418 in the corresponding dictionaries. The navigation system 100 can also have dictionaries containing individual search words rather than complete phrases. In such cases, the navigation system 100 can search for the search word 204 indicated by the forward-pointer 410, the backward-pointer 412, or both.

The navigation system 100 can perform the iterations in the forward direction 402 until the front-thread 416, the search word 204 indicated by the forward-pointer 410, or a combination thereof is no longer found in the point-of-interest dictionary 312. In such case, the navigation system 100 can remove the recently added search word from the front-thread 416 or the end-thread 418, preserve the location or value of the boundaries, or a combination thereof. The navigation system 100 can then enter the appropriate stop state.

Continuing with the example, the navigation system 100 can continue the repetition of steps or iterations until the search word 204 'store' or the front-thread 416 of 'grocery store' can be found in the point-of-interest dictionary 312 but not '1234' or 'grocery store 1234'. The navigation system 100 can preserve the forward-boundary 406 between 'store' and '1234', remove '1234' from the front-thread 416, or both. The navigation system 100 can also enter the forward-stop state 420.

When the navigation system 100 enters both the forward-stop state 420 and the backward-stop state 422, the navigation system 100 can evaluate the locations or values of the forward-boundary 406 and the backward-boundary 408. If the forward-boundary 406 and the backward-boundary 408 have not crossed as shown in the iteration number of 'TN−4', the navigation system 100 can recursively perform the above steps using a subset of the search string 206 the forward-boundary 406 and the backward-boundary 408, calculate the confidence level 310, or perform an external search for the matching result 308 of FIG. 3 using the forward-boundary 406 and the backward-boundary 408, or a combination thereof.

If the forward-boundary 406 and the backward-boundary 408 coincide as shown in the iteration number 'TN−1', the navigation system 100 can calculate the confidence level 310, set or determine the search-term boundary 222, perform the external search for the matching result 308, or a combination thereof. If the forward-boundary 406 and the backward-boundary 408 do not coincide and have crossed each other, where the front-thread 416 and the end-thread 418 overlap, the navigation system 100 can reanalyze the search string 206 using different dictionaries, perform the external search, calculate the confidence level 310, or a combination thereof.

The navigation system 100 can prevent the two threads from overlapping. The navigation system 100 can perform similar operations as when the forward-boundary 406 and the backward-boundary 408 do not coincide if the forward-boundary 406 and the backward-boundary 408 coincide and both the forward-stop state 420 and the backward-stop state 422 have not been entered. Details regarding the above described process will be discussed below.

It has been discovered that the forward-boundary 406, the backward-boundary 408, the front-thread 416, the end-thread 418, the model search pattern 216, the point-of-interest dictionary 312, and the address dictionary 314 give rise to more efficient and accurate searching for the matching result 308. The navigation system 100 can have the model search pattern 216 describe often used formats or values of the search string 206 particular to the region, the user, or a combination thereof and narrow the search using the forward-boundary 406, the backward-boundary 408, the front-thread 416, the end-thread 418, the point-of-interest dictionary 312, and the address dictionary 314.

Figure 5:
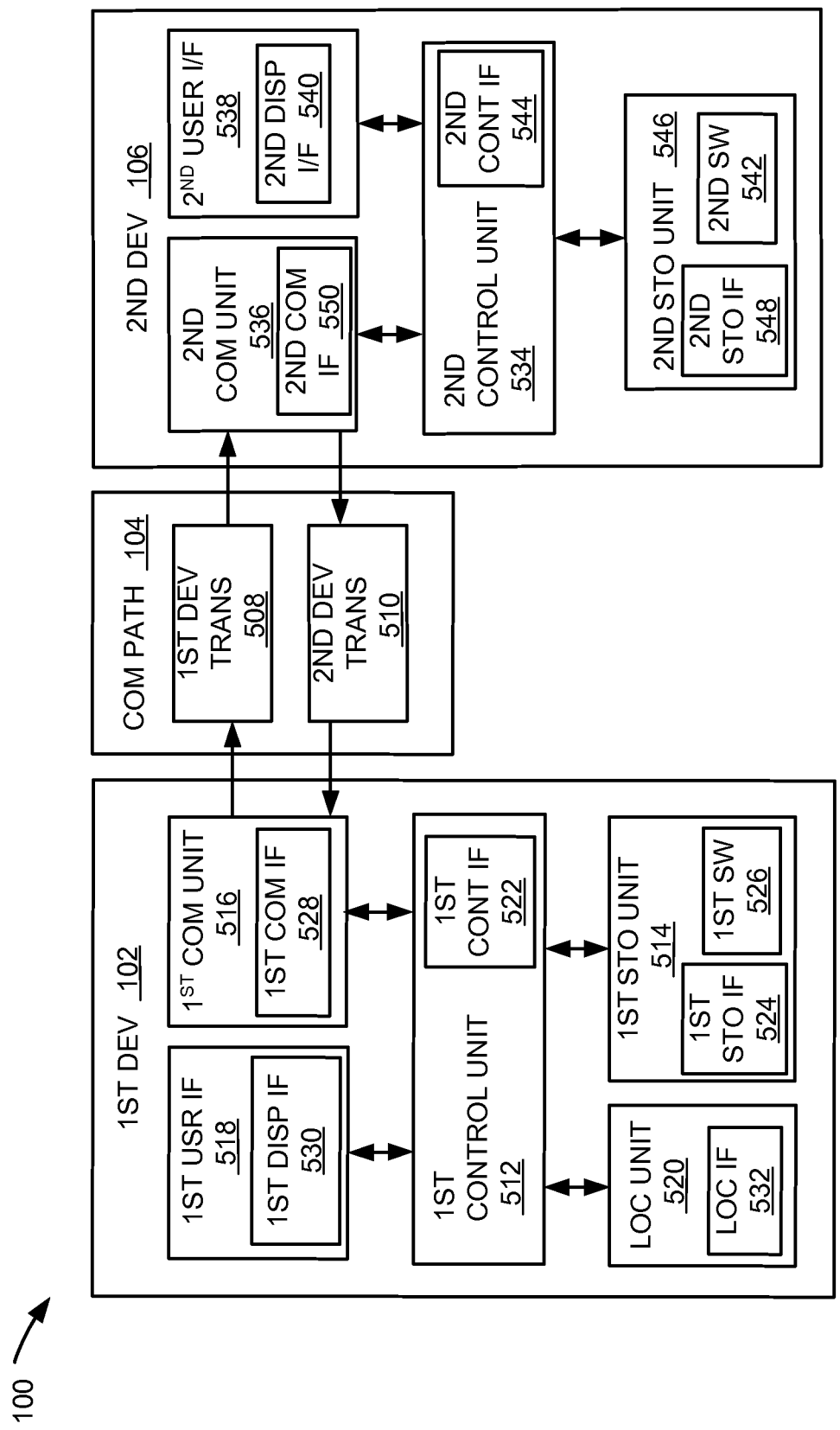
FIG. 5 is an exemplary block diagram of the navigation system.

Referring now to FIG. 5, therein is shown an exemplary block diagram of the navigation system 100. The navigation system 100 can include the first device 102, the communication path 104, and the second device 106.

The first device 102 can communicate with the second device 106 over the communication path 104. The screen shot shown on the display interface 202 of FIG. 2 described in FIGS. 2-4 can represent the screen shot for the navigation system 100

The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a location unit 520. The first control unit 512 can include a first control interface 522. The first storage unit 514 can include a first storage interface 524.

The first control unit 512 can execute a first software 526 to provide the intelligence of the navigation system 100. The first control unit 512 can operate the first user interface 518 to display information generated by the navigation system 100. The first control unit 512 can also execute the first software 526 for the other functions of the navigation system 100, including receiving location information from the location unit 520. The first control unit 512 can further execute the first software 526 for interaction with the communication path 104 via the first communication unit 516.

The first control unit 512 can be implemented in a number of different manners. For example, the first control unit 512 can be a processor, an embedded processor, a microprocessor, a hardware control logic, a hardware finite state machine, a digital signal processor, or a combination thereof.

The first control unit 512 can include the first control interface 522. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system, optical circuitry, waveguides, wireless circuitry, wireline circuitry, or a combination thereof.

The first storage unit 514 can store the first software 526. The first storage unit 514 can also store the relevant information, such as advertisements, points of interest, navigation routing entries, or any combination thereof.

The first storage unit 514 can be a volatile memory, a nonvolatile memory, an internal memory, an external memory, or a combination thereof. For example, the first storage unit 514 can be a nonvolatile storage such as nonvolatile random access memory, Flash memory, disk storage, or a volatile storage such as static random access memory.

The first storage unit 514 can include the first storage interface 524. The first storage interface 524 can be used for communication between the location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. Examples of the output device of the first user interface 518 can include the first display interface 530. The first display interface 530 can include a display, a projector, a video screen, a speaker, or any combination thereof.

The location unit 520 can generate location information, current heading, current acceleration, and current speed of the first device 102, as examples. The location unit 520 can be implemented in many ways. For example, the location unit 520 can function as at least a part of GPS, an inertial navigation system, a cellular-tower location system, a pressure location system, or any combination thereof. Also, for example, the location unit 520 can utilize components such as an accelerometer or GPS receiver.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations external to the first device 102.

The location interface 532 can include different implementations depending on which functional units or external units are being interfaced with the location unit 520. The location interface 532 can be implemented with technologies and techniques similar to the implementation of the first control unit 512.

For illustrative purposes, the first device 102 is shown with the partition having the first control unit 512, the first storage unit 514, the first user interface 518, the first communication unit 516, and the location unit 520 although it is understood that the navigation system 100 can have a different partition. For example, the first software 526 can be partitioned differently such that some or all of its function can be in the first control unit 512, the location unit 520, and the first communication unit 516. Also, the first device 102 can include other functional units not shown in FIG. 5 for clarity.

The functional units in the first device 102 can work individually and independently of the other functional units. The first device 102 can work individually and independently from the second device 106 and the communication path 104.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine, a digital signal processor, or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a micro electromechanical system, optical circuitry, waveguides, wireless circuitry, wireline circuitry, or a combination thereof.

A second storage unit 546 can store the second software 542. The second storage unit 546 can also store the relevant information, such as advertisements, points of interest, navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as nonvolatile random access memory, Flash memory, disk storage, or a volatile storage such as static random access memory.

The second storage unit 546 can include a second storage interface 548. The second storage interface 548 can be used for communication between the location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 520, although it is understood that the second device 106 can also operate the location unit 520.

Figure 6:
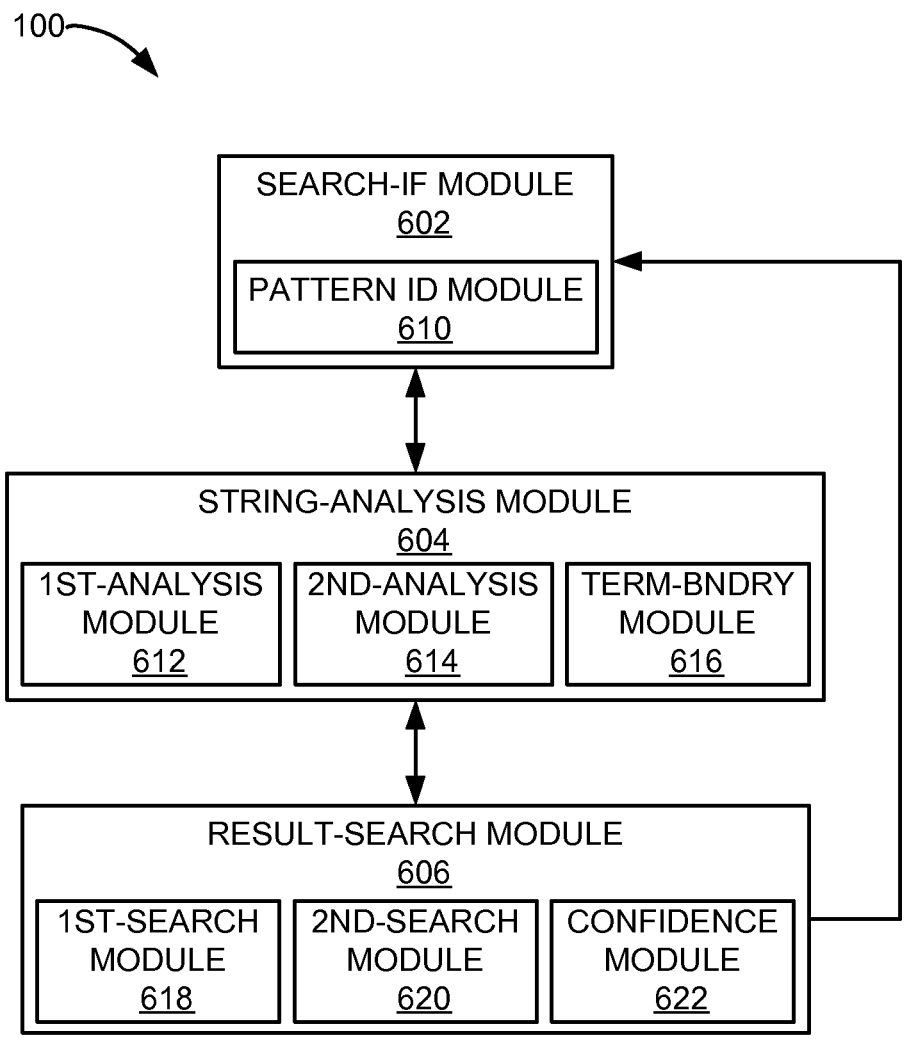
FIG. 6 is a control flow of the navigation system.

Referring now to FIG. 6, therein is shown a control flow of the navigation system 100. The navigation system 100 can have a search-interface module 602, a string-analysis module 604, and a result-search module 606. The search-interface module 602 can be coupled to the string-analysis module 604 and the result-search module 606. The string-analysis module 604 can also be coupled to the result-search module 606.

The search-interface module 602 is for detecting the search string 206 of FIG. 2. The search-interface module 602 can detect the search string 206 for determining the matching result 308 of FIG. 3 within the map of FIG. 3 or determining the matching result 308 of a web search.

The search-interface module 602 can detect the search string 206 by examining the first user interface 518 of FIG. 5, the second user interface 538 of FIG. 5, or a combination thereof. For example, the search-interface module 602 can detect the search string 206 when or as the user of the first device 102 of FIG. 1 inputs the search word 204 of FIG. 2 or enters 'return' or end of line character after typing a series of words through the first user interface 518.

The search-interface module 602 can also detect the search string 206 by querying the user through a sequence of predetermined screens, questions, or a combination thereof through the first display interface 530 of FIG. 5, the second display interface 540 of FIG. 5, or a combination thereof. The search-interface module 602 can detect the search string 206 using the first control unit 512 of FIG. 5, the second control unit 534 of FIG. 5, or both by receiving the user's responses or inputs to the predetermined screens, questions, or a combination thereof. The search-interface module 602 can store the search string 206 in the first storage unit 514 of FIG. 5, the second storage unit 546 of FIG. 5, or a combination thereof.

The search-interface module 602 can have a pattern identification module 610. The pattern identification module 610 is for identifying patterns related to the search string 206. The pattern identification module 610 can identify patterns using a device current location of the first device 102, the search string 206, user input, or a combination thereof.

The pattern identification module 610 can determine the device current location using the navigation information from the location unit 520 of FIG. 5. The pattern identification module 610 can select or identify patterns appropriate for the location of the first device 102.

For example, if the first device 102 is located in United States, the pattern identification module 610 can identify or select the model search pattern 216 of FIG. 2 corresponding to the device current location. The search-interface module 602 can identify or select common patterns for the search string in the United States, such as the format of point of interest followed by an address using the model search pattern 216. Also, for example, the search-interface module 602 can identify or select and forward the model search pattern 216 as being focused on landmarks when the first device 102 is in Asia.

The pattern identification module 610 can also analyze the search string 206 to identify or select the model search pattern 216. The pattern identification module 610 can analyze the search string 206 by detecting or identifying the operating term 210, regional identifiers, such as zip codes or country names or acronyms, or a combination thereof. The pattern identification module 610 can identify or select the model search pattern 216 appropriate for the analysis of the search string 206.

The pattern identification module 610 can further identify or select the model search pattern 216 by determining the pattern of user input or the pattern within the search string 206. For example, the pattern identification module 610 can have a table or a template pattern that describes the point of interest information or address information for different regions.

For instance, the pattern identification module 610 can identify that the user input sequence of numbers-words-two letter state acronym-then 5 digit numbers is a common pattern for addresses in the United States. Also, for instance, the pattern identification module 610 can have a table or a dictionary for street designations used in the input language, such as street or boulevard for English.

The pattern identification module 610 can also use feedback information from the string-analysis module 604 and the result-search module 606 to adjust the model search pattern 216. The pattern identification module 610 can store the search string 206, the matching result 308, the dictionary, user inputs, or a combination thereof and use the patterns to adjust the model search pattern 216.

The pattern identification module 610 can use the first control unit 512, the second control unit 534, or a combination thereof to identify, determine, adjust, or a combination thereof described above. The pattern identification module 610 can store the results, such as the model search pattern 216, in the first storage unit 514, the second storage unit 546, or a combination thereof.

It has been discovered that the pattern identification module 610 and the model search pattern 216 provide for decrease in required memory and efficiency in performing the process. The pattern identification module 610 and the model search pattern 216 can provide the decrease in required memory and efficiency in performance by accurately predicting the user's search pattern and self-adjusting to reduce the number of necessary information and iterations.

The search-interface module 602 can pass the control flow along with the search string 206 and the model search pattern 216 to the string-analysis module 604. The string-analysis module 604 is for analyzing the search string 206 for performing the search for the matching result 308.

The string-analysis module 604 can select a dictionary for performing the search. The string-analysis module 604 can select the dictionary using the model search pattern 216. For example, when the model search pattern 216 indicates a location or a pattern used within the United States, the string-analysis module 604 can select the point-of-interest dictionary 312 of FIG. 3 and the address dictionary 314 of FIG. 3 appropriate for the United States.

The string-analysis module 604 can further follow the commonly used pattern indicated through the model search pattern 216. Continuing with the example, when the model search pattern 216 is for the United States, the string-analysis module 604 can select the point-of-interest dictionary 312 for the forward search and the address dictionary 314 for the backward search.

The string-analysis module 604 can process the model search pattern 216 and the selection of the dictionaries through the first control interface 522 of FIG. 5, the second controller interface 544 of FIG. 5, or a combination thereof. The string-analysis module 604 can access the necessary information and store the results through the first storage interface 524 of FIG. 5, the second storage interface 548 of FIG. 5, or a combination thereof.

The string-analysis module 604 can store the dictionary selections and the corresponding values of the search string 206. The string-analysis module 604 can also select different dictionaries when the sub-modules fail to find the matching result 308, the search-term boundary 222 of FIG. 2, or a combination thereof.

The string-analysis module 604 can further use the first control unit 512, the second control unit 534, or a combination thereof to initialize threads, boundaries, strings, pointers, or a combination thereof using the search string 206. The string-analysis module can initialize the front-thread 416 of FIG. 4, the end-thread 418 of FIG. 4, the forward-pointer 410 of FIG. 4, the backward-pointer 412 of FIG. 4, the forward-boundary 406 of FIG. 4, the backward-boundary of FIG. 4, or a combination thereof as described above in FIG. 4.

The string-analysis module 604 can have a first-analysis module 612, a second-analysis module 614, and a term-boundary module 616 as sub-modules. The string-analysis module 604 can perform a directional analysis of the search string 206 in the forward direction 402 of FIG. 4 through the first-analysis module 612. The string-analysis module 604 can perform a direction analysis in the backward direction 404 of FIG. 4 through the second-analysis module 614.

The first-analysis module 612 is for determining the forward-element 218 of FIG. 2 using the forward-boundary 406 of FIG. 2 within the search string 206 in the forward direction 402. The first-analysis module 612 can use the first control unit 512, the second control unit 534, or a combination thereof to search the dictionaries for the forward search. The first-analysis module 612 can search the dictionaries, such as the point-of-interest dictionary 312 or a dictionary for operating terms, stored in the first storage unit 514, the second storage unit 546, or a combination thereof.

The first-analysis module 612 can use the first control unit 512, the second control unit 534, or a combination thereof to perform the analysis and the iterations described above. The first-analysis module 612 can determine whether there is a match or a partial match for the front-thread 416 in the dictionary, add or remove search words to or from the front-thread 416, move or preserve the location or value of the forward-pointer 410 or the forward-boundary 406, enter the forward-stop state 420 of FIG. 4, or a combination thereof. The first-analysis module 612 can repeat the necessary steps and increment the iteration number 414 of FIG. 4.

When the first-analysis module 612 finds a match in a dictionary through the iterative analysis, the first-analysis module 612 can set the result in the front-thread 416 as the forward-element 218. The first-analysis module 612 can further select the detected forward-format 212 when a match is found. The first-analysis module 612 can select the detected forward-format 212 by setting the identifier of the dictionary for the match as the detected forward-format 212.

The second-analysis module 614 is for determining the backward-element 220 of FIG. 2 in the backward direction 404 up to the forward-boundary 406 using the backward-boundary 408 of FIG. 2 within the search string 206. The second-analysis module 614 can be similar to the first-analysis module 612.

The second-analysis module 614 can use the first control unit 512, the second control unit 534, or a combination thereof to search the dictionaries for the backward search. The second-analysis module 614 can search the dictionaries, such as the address dictionary 314 or a dictionary for key words, stored in the first storage unit 514, the second storage unit 546, or a combination thereof.

The second-analysis module 614 can use the first control unit 512, the second control unit 534, or a combination thereof to perform the analysis and the iterations described above. The second-analysis module 614 can determine whether there is a match or a partial match for the end-thread 418 in the dictionary, add or remove search words to or from the end-thread 418, move or preserve the location or value of the backward-pointer 412 or the backward-boundary 408, enter the backward-stop state 422 of FIG. 4, or a combination thereof. The second-analysis module 614 can repeat the necessary steps and increment the iteration number 414.

When the first-analysis module 612 finds a match in a dictionary through the iterative analysis, the second-analysis module 614 can set the result in the end-thread 418 as the backward-element 220. The first-analysis module 612 can further select the detected backward-format 214 when a match is found. The second-analysis module 614 can select the detected backward-format 214 by setting the identifier of the dictionary for the match as the detected backward-format 214.

The term-boundary module 616 is for determining the search-term boundary 222 of FIG. 2 within the search string 206. The term-boundary module 616 can determine the search-term boundary 222 by using the first control interface 522, the second controller interface 544, or a combination thereof to identify the location of the forward-boundary 406 and the backward-boundary 408 relative to the search string 206. The term-boundary module 616 can determine the search-term boundary 222 as the location where the forward-boundary 406 and the backward-boundary 408 coexist.

If the forward-boundary 406 and the backward-boundary 408 do not coexist at the same location and have not overlapped each other, the term-boundary module 616 can store the locations of the forward-boundary 406 and the backward-boundary 408. The term-boundary module 616 can create a temporary string with a portion of the search string 206 between the two boundaries. The term-boundary module 616 can set a flag or send a signal to repeat the analysis starting with the initialization of the string-analysis module 604 using the temporary string as the search string 206.

The term-boundary module 616 can compare the stored locations of the forward-boundary 406 and the backward-boundary 408 from the previous analysis to the determined locations of the forward-boundary 406 and the backward-boundary 408 of the analysis for the truncated string. If the locations co-exist, the term-boundary module 616 can determine the coexisting locations as multiple values of the search-term boundary 222. The term-boundary module 616 can repeat the process until all of the boundaries either co-exist or overlap past each other.

If the forward-boundary 406 and the backward-boundary 408 do not coexist at the same location and have overlapped each other, the term-boundary module 616 can store the locations of the forward-boundary 406 and the backward-boundary 408. The term-boundary module 616 can use probability models, human-behavior models, statistical information, or a combination thereof to calculate the probability of the forward-boundary 406 or the backward-boundary 408 being the search-term boundary 222 and end the analysis of the search string 206.

It has been discovered that the first-analysis module 612, the forward-boundary 406, the forward-element 218, the second-analysis module 614, the backward-boundary 408, the backward-element 220, the term-boundary module 616, and the search-term boundary 222 provide efficient and accurate analysis of the search string 206. The above elements provide efficient and accurate analysis for the navigation system 100 by simultaneously analyzing the search string 206 in multiple directions without having to analyze the entirety of the search string 206 in each direction.

The string-analysis module 604 can provide the identified, selected, determined, and calculated information to the search-interface module 602 and the result-search module 606. The search-interface module 602 can use the forward-element 218, the backward-element 220, the search-term boundary 222, the detected forward-format 212, the detected backward-format 214, or a combination thereof to adjust the model search pattern 216.

The result-search module 606 can use the forward-element 218, the backward-element 220, the search-term boundary 222, or a combination thereof to perform the external searches. The result-search module 606 is for determining the matching result 308 for the search string 206. The result-search module 606 can determine the matching result 308 using the forward-element 218 and the backward-element 220 for displaying on the first device 102, the second device 106 of FIG. 1, or a combination thereof.

The result-search module 606 can have a first-search module 618, a second-search module 620, and a confidence module 622 for determining the matching result 308. The result-search module 606 can use the outputs and processed results of the first-search module 618, the second-search module 620, the confidence module 622, or a combination thereof to determine the matching result 308.

The first-search module 618 is for identifying the forward-search result 304 using the forward-element 218. The first-search module 618 can search the internet, location databases, the map 302 of FIG. 3, other maps, through the first communication unit 516 of FIG. 5, the second communication unit 536 of FIG. 5, the first control unit 512, the second control unit 534, or a combination thereof for the forward-element 218.

The first-search module 618 can set the location, name, webpage, coordinates, portions thereof, or a combination thereof matching the forward-element 218 as the forward-search result 304. The first-search module 618 can use the first display interface 530, the second display interface 540, or a combination thereof to display the forward-search result 304.

The second-search module 620 is for identifying the backward-search result 306 using the backward-element 220. The second-search module 620 can be similar to the first-search module 618. The second-search module 620 can search the internet, location databases, the map 302, other maps, through the first communication unit 516, the second communication unit 536, the first control unit 512, the second control unit 534, or a combination thereof for the backward-element 220.

The second-search module 620 can set the location, name, webpage, coordinates, portions thereof, or a combination thereof matching the backward-element 220 as the backward-search result 306. The second-search module can use the first display interface 530, the second display interface 540, or a combination thereof to display the backward-search result 306.

The confidence module 622 is for determining the confidence level 310 by comparing the forward-search result 304 and the backward-search result 306. The confidence module 622 can also determine the confidence level 310 using the forward-search result 304, the backward-search result 306, the forward-boundary 406, the backward-boundary 408, the search-term boundary 222, or a combination thereof.

The confidence module 622 can determine the confidence level 310 by comparing the location of the forward-search result 304 and the backward-search result 306. The confidence module 622 can calculate the confidence level 310 to be high if the forward-search result 304 is within the comparison area 224 of FIG. 2 of the backward-search result 306 or if the backward-search result 306 is within the comparison area 224 of the forward-search result 304.

The confidence module 622 can further have a predetermined equation or calculation result that uses the distance between the forward-search result 304 and the backward-search result 306 to calculate the confidence level 310. For example, the predetermined equation can calculate the confidence level 310 to be 100% if the forward-search result 304 and the backward-search result 306 are the same location. Also, for example, the predetermined equation can calculate the confidence level 310 to be lower as the physical or logical distance between the forward-search result 304 and the backward-search result 306 increase.

The confidence module 622 can have the comparison area 224, the predetermined equation, or a combination thereof predetermined by the navigation system 100, a software or hardware manufacturer, a service provider, a user, or a combination thereof. The confidence module 622 can access the comparison area 224, the predetermined equation, or both stored in the first storage unit 514, the second storage unit 546, or both. The confidence module 622 can use the first control unit 512, the second control unit 534, or a combination thereof to calculate the confidence level 310.

The confidence module 622 can further calculate the confidence level 310 using the forward-boundary 406, the backward-boundary 408, the search-term boundary 222, or a combination thereof. For example, the confidence module 622 can set the confidence level 310 at 100% or high when the search-term boundary 222 exists. Also, for example, the confidence module 622 can use equations similar to the ones described above to calculate the confidence level 310 as a function of the forward-boundary 406, the backward-boundary 408, the search-term boundary 222, or a combination thereof.

The result-search module 606 can use the confidence level 310, the forward-search result 304, the backward-search result 306, or a combination thereof to determine the matching result 308. For example, the result-search module 606 can determine the matching result 308 as the forward-search result 304 and the backward-search result 306 when the two results are the same or within the comparison area 224 of each other. Also, for example, the result-search module 606 can determine the result-search module 606 to be the forward-search result 304 and the backward-search result 306 when the search-term boundary 222 exists.

The result-search module 606 can use the first control unit 512, the second control unit 534, or a combination thereof to determine the matching result 308. The result-search module 606 can use the first display interface 530, the second display interface 540, or a combination thereof to display the matching result 308 on the first device 102, the second device 106, or a combination thereof.

The result-search module 606 can store the matching result 308, the forward-search result 304, the backward-search result 306, the confidence level 310, or a combination thereof in the first storage unit 514, the second storage unit 546, or a combination thereof. The result-search module can also pass the results to the string-analysis module 604, the search-interface module 602, or both. The search-interface module 602 can use the feedback information from the result-search module 606 to adjust and update the model search pattern 216.

The string-analysis module 604 can select different dictionaries and reanalyze the search string 206 when the confidence level 310 is low or below a threshold level. The string-analysis module 604 can pass the reanalyzed data to the result-search module 606 to repeat the external search process. The result-search module 606 can have a count limit for the loop process that limits the number of reanalyzing process.

The string-analysis module 604 can further add the forward-element 218, the backward-element 220 or both to the high-interest set 316 of FIG. 3. The string-analysis module 604 can record the forward-element 218, the backward-element 220 or both, and increment a count for the specific values therein whenever the confidence level is high or 100%. The string-analysis module 604 can have a frequency floor for comparing against the increment. The string-analysis module 604 can add the forward-element 218, the backward-element 220 or both to the high-interest set 316 whenever the increment for the value therein exceeds the frequency floor.

The threshold level, the count limit, the frequency floor, or a combination thereof can be predetermined by the navigation system 100, the user, the software or hardware manufacturer, or a combination thereof. These values can be stored in the first storage unit 514, the second storage unit 546, or a combination thereof.

It has been discovered that the forward-search result 304, the backward-search result 306, the confidence level 310, and the result-search module 606 provide for improved quality of the matching result 308, simpler architecture for the navigation system 100, and reduced processing time. The forward-search result 304, the backward-search result 306, the confidence level 310, and the result-search module 606 provide for the above benefits by performing independent searches for different ideas, portions, or segments of the search string 206 and analyzing the correlation between the results of the independent searches to determine the matching result 308.

It has also been discovered that the model search pattern 216 gives rise to the navigation system 100 having simpler and faster execution, while processing less data by providing a pattern for recognizing and processing the search string 206. It has further been discovered that the model search pattern 216, the detected forward-format 212, and the detected backward-format 214 give rise to improved accuracy for the searches by allowing enhanced analysis of the search string 206 to find a desired result.

The physical transformation of the matching result 308, such as the more accurate location of the nearest store or updated search results based on new information or location, results in movement in the physical world, such as users taking advantage of the more accurate and current search result and operate on these results, such as make a transaction or travel to the location identified by those results. The movement of people and entities in the real world can be fed back to the navigation system 100 to adjust the model search pattern 216 and the dictionaries, and further operate the navigation system 100 to guide the user.

For illustrative purposes, the modules described above are specific to the first device 102 or the second device 106. However, it is understood that the modules can be located differently. For example, the search-interface module 602 can be on the second device 106 and the pattern identification module 610 can be on the first device 102. Also for example, the string-analysis module 604 can be on the first device 102 or across both the first device 102 and the second device 106 while the result-search module can be on the second device 106.

It is also understood that the various modules described above can be implemented as hardware in the first control unit 512, the second control unit 534, or both. The different modules can also be implemented as separate hardware mechanism, circuit, or device (not illustrated) in the first device 102, the second device 106, or a combination thereof.

Figure 7:
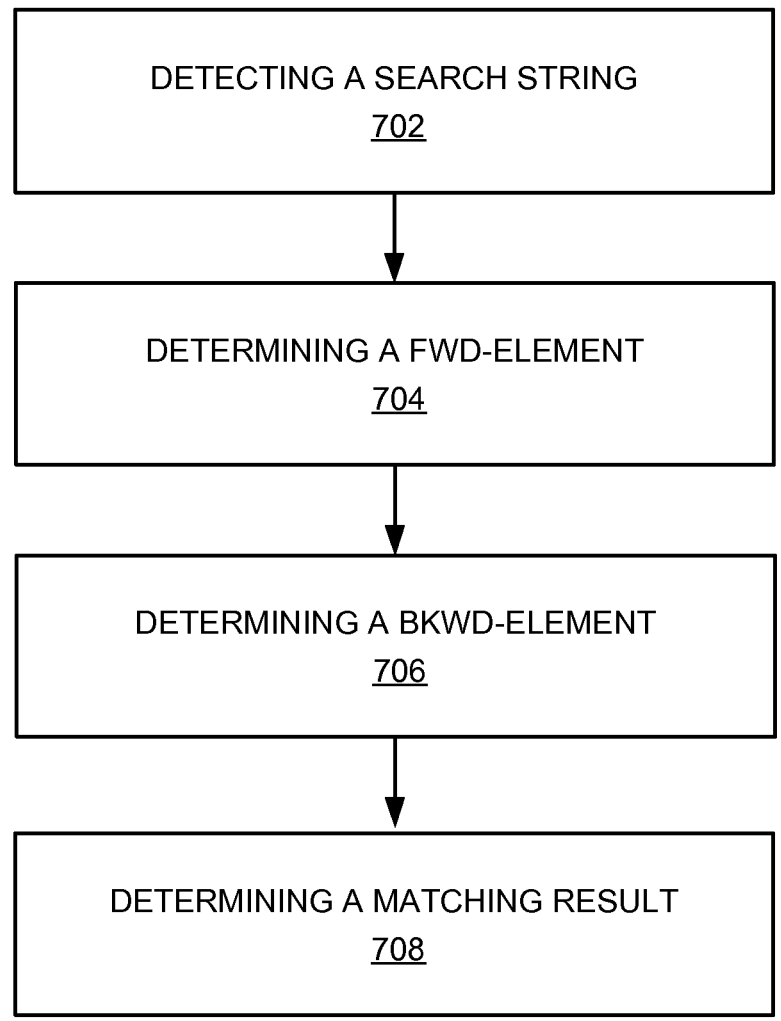
FIG. 7 is a flow chart of a method of operation of the navigation system in a further embodiment of the present invention.

Referring now to FIG. 7, therein is shown a flow chart of a method 700 of operation of the navigation system 100 in a further embodiment of the present invention. The method 700 includes: detecting a search string in a block 702; determining a forward-element using a forward-boundary within the search string in a forward direction in a block 704; determining a backward-element in a backward direction up to the forward-boundary using a backward-boundary within the search string in a block 706; and determining a matching result for the search string using the forward-element and the backward-element for displaying on a device in a block 708.

Yet other important aspects of the embodiments include that it valuably supports and services the historical trend of reducing costs, simplifying systems, and increasing performance.

These and other valuable aspects of the embodiments consequently further the state of the technology to at least the next level.

Thus, it has been discovered that the navigation system of the present invention furnishes important and heretofore unknown and unavailable solutions, capabilities, and functional aspects for improving reliability in systems. The resulting processes and configurations are straightforward, cost-effective, uncomplicated, highly versatile, and effective, can be implemented by adapting known technologies, and are thus readily suited for efficiently and economically operating navigation systems.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   detecting a search string including a beginning and an end;
   determining a forward-element using a forward-boundary moving within the search string in a forward direction from the beginning of the search string;
   determining a backward-element using a backward-boundary moving in a backward direction from the end of the search string; and
   determining a matching result for the search string with a control unit using a location of the forward-boundary relative to the backward-boundary, the forward-element and the backward-element for displaying on a device.

2. The method as claimed in claim 1 wherein determining the matching result includes determining a search-term boundary within the search string.

3. The method as claimed in claim 1 further comprising:
   identifying a forward-search result using the forward-element;
   identifying a backward-search result using the backward-element; and
   wherein:
   determining the matching result includes comparing the forward-search result and the backward-search result.

4. The method as claimed in claim 1 wherein determining the forward-element includes selecting a detected forward-format of the forward-element in the search string.

5. The method as claimed in claim 1 wherein determining the backward-element includes selecting a detected backward-format of the backward-element in the search string.

6. A method of operation of a navigation system comprising:
   detecting a search string including a beginning and an end for searching within a map;
   determining a forward-element using a forward-boundary moving within the search string in a forward direction from the beginning of the search string;
   determining a backward-element using a backward-boundary moving in a backward direction from the end of the search string; and
   determining the matching result for the search string with a control unit using a location of the forward-boundary relative to the backward-boundary, the forward-element and the backward-element for displaying on a device.

7. The method as claimed in claim 6 wherein determining the matching result includes determining a confidence level of the matching result using the forward-boundary and the backward-boundary.

8. The method as claimed in claim 6 wherein determining the matching result includes determining a confidence level of the matching result using the forward-search result and the backward-search result.

9. The method as claimed in claim 6 further comprising:
   selecting a front-thread using a portion of the search string;
   wherein:
   determining the forward-element includes searching for the front-thread in a point-of-interest dictionary.

10. The method as claimed in claim 6 further comprising:
    selecting an end-thread using a portion of the search string;
    wherein:
    determining the backward-element includes searching for the end-thread in an address dictionary.

11. A navigation system comprising:
    a user interface for detecting a search string including a beginning and an end; and
    a control unit, implemented in hardware and coupled to the user interface, for:
    determining a forward-element using a forward-boundary moving within the search string in a forward direction from the beginning of the search string;
    determining a backward-element using a backward-boundary moving in a backward direction from the end of the search string; and
    determining a matching result for the search string using a location of the forward-boundary relative to the backward-boundary the forward-element and the backward-element.

12. The system as claimed in claim 11 wherein the control unit is for determining a search-term boundary within the search string.

13. The system as claimed in claim 11 wherein the control unit is for:
    identifying a forward-search result using the forward-element;
    identifying a backward-search result using the backward-element; and
    comparing the forward-search result and the backward-search result.

14. The system as claimed in claim 11 wherein the control unit is for selecting a detected forward-format of the forward-element in the search string.

15. The system as claimed in claim 11 wherein the control unit is for selecting a detected backward-format of the backward-element in the search string.

16. The system as claimed in claim 11 wherein the user interface is for detecting the search string for determining the matching result within a map.

17. The system as claimed in claim 16 wherein the control unit is for determining a confidence level of the matching result using the forward-boundary and the backward-boundary.

18. The system as claimed in claim 16 wherein the control unit is for determining a confidence level of the matching result using the forward-search result and the backward-search result.

19. The system as claimed in claim 16 wherein:
the user interface is for selecting a front-thread using a portion of the search string; and
the control unit is for searching for the front-thread in a point-of-interest dictionary.

20. The system as claimed in claim 16 wherein:
the user interface is for selecting an end-thread using a portion of the search string; and
the control unit is for searching for the end-thread in an address dictionary.

* * * * *